(No Model.)

R. F. IVEY.
Turpentine Spout.

No. 239,504. Patented March 29, 1881.

WITNESSES:
Chas. Nida
C. Sedgwick

INVENTOR:
R. F. Ivey
BY Munn & Co
ATTORNEYS.

N. PETERS, PHOTO-LITHOGRAPHER, WASHINGTON, D. C.

UNITED STATES PATENT OFFICE.

ROBERT F. IVEY, OF WILLIAMSBURG, GEORGIA.

TURPENTINE-SPOUT.

SPECIFICATION forming part of Letters Patent No. 239,504, dated March 29, 1881.

Application filed September 21, 1880. (No model.)

*To all whom it may concern:*

Be it known that I, ROBERT F. IVEY, of Williamsburg, Calhoun county, State of Georgia, have invented a new and Improved Turpentine-Spout, of which the following is a specification.

The object of my invention is to provide a new and improved turpentine-spout, which is simple in construction, can be easily attached to the tree, and does not require boxing in of the tree as now practiced.

Figure 1:
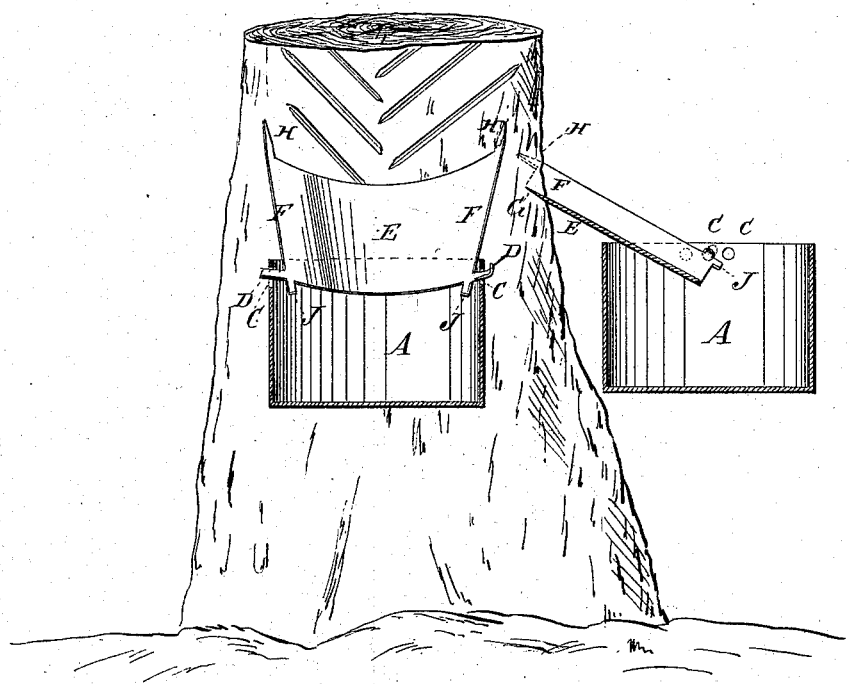
Figure 2:
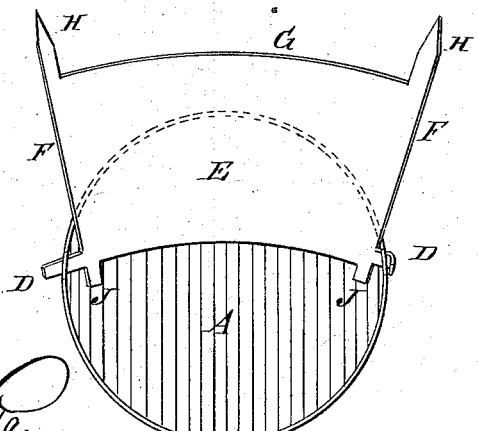

In the drawings, Figure 1 represents a longitudinal and a cross-sectional elevation of my improved turpentine-spout, showing the manner in which it is held to the tree. Fig. 2 is a plan view of the same.

Similar letters of reference indicate corresponding parts.

A bucket or box, A, of wood or metal, is provided with the perforations C C, through which the studs, pivots, or pins D, projecting from the sides of a plate or spout, E, pass, and thus support this bucket or box. This plate E is slightly concaved, and is provided with flanges F F along the sides, for the purpose of preventing the turpentine from flowing off. The upper edge, G, of the plate is beveled or sharpened, so as to pass into the tree more easily, and a sharp pin or stud, H, is arranged at each end or the middle of this edge. The opposite edge of the plate E is provided with projections J J, for driving the sharp edge G and the pins or studs H into the tree. The plate E is preferably made of malleable iron.

The operation is as follows: The plate or spout E is driven into the tree with an inclination upward, so that the pine gum or turpentine that flows down the scarified face of the tree will flow down the plate into the bucket, thus avoiding boxing with the axe, which has been necessary heretofore. The turpentine need not be dipped from the vessel, for the same can be easily detached or emptied.

This box or bucket can be attached to either small or large trees with the same advantage.

Having thus described my invention, I claim as new and desire to secure by Letters Patent—

The combination, with the turpentine-spout E, provided with a sharp edge, pointed prongs H, and pivots D D, of the bucket or box A, substantially as herein shown and described, and for the purpose set forth.

ROBERT FLORIZELL IVEY.

Witnesses:
N. W. PACE,
J. W. BROWN,
L. G. CARTLEDGE.